United States Patent [19]

Cranford, III et al.

[11] Patent Number: 5,426,677
[45] Date of Patent: Jun. 20, 1995

[54] DEVICE AND METHOD FOR MEASURING TEMPERATURE OF A LIQUID CONTAINED IN A PRESSURIZER VESSEL

[75] Inventors: Elwyn L. Cranford, III, Greensburg; Mark A. Gray, Turtle Creek, both of Pa.

[73] Assignee: Westinghouse Electric Corporation, Pittsburgh, Pa.

[21] Appl. No.: 176,409

[22] Filed: Jan. 3, 1994

[51] Int. Cl.[6] ............................................. G21C 17/00
[52] U.S. Cl. .................................. 376/247; 376/254; 376/258
[58] Field of Search ............... 376/247, 249, 254, 258, 376/210; 165/13, 31, 37; 347/137

[56] References Cited

U.S. PATENT DOCUMENTS

| | | | |
|---|---|---|---|
| 3,716,450 | 2/1973 | Lions | 376/247 |
| 4,162,175 | 7/1979 | Salt et al. | 136/233 |
| 4,602,767 | 7/1986 | Spiegelman et al. | 266/87 |
| 4,725,399 | 2/1988 | McCulloch et al. | 376/247 |
| 4,859,076 | 8/1989 | Twerdochlib | 374/10 |
| 4,901,061 | 2/1990 | Twerdochlib | 340/604 |
| 4,915,500 | 4/1990 | McCulloch et al. | 374/166 |

*Primary Examiner*—Donald P. Walsh
*Assistant Examiner*—Meena Chelliah

[57] ABSTRACT

A pressurizer vessel of a nuclear power plant contains a liquid and steam both of which function to maintain pressure in a reactor coolant system. A heater support assembly is disposed in an interior portion of the pressurizer vessel and receive a plurality of heaters which are matingly fitted with the heater support assembly for heating the liquid. A temperature detector is operatively connected to the heater support assembly in a structural arrangement which allows for measuring the temperature of the liquid at a plurality of preselected elevations. The temperature detector further includes temperature measuring means for measuring a plurality of temperature readings of the liquid at preselected elevations of the liquid.

10 Claims, 2 Drawing Sheets

DEVICE AND METHOD FOR MEASURING TEMPERATURE OF A LIQUID CONTAINED IN A PRESSURIZER VESSEL

BACKGROUND OF THE INVENTION

1. Field of the Invention

The present invention relates generally to a device and method for temperature measurement of a liquid contained in a pressurizer vessel of a nuclear power plant and, more particularly, to such a device and method which measure the temperature of the liquid at preselected elevations for detecting temperature gradients in the liquid.

2. Description of the Related Art

A typical nuclear power facility includes a nuclear reactor wherein a controlled nuclear reaction, which generates heat, is occurring. Typically, borated water is contained in the reactor for controlling the nuclear reaction process and for passing the heat away from the reactor. A primary loop communicating with the reactor functions to pass the borated water (i.e., the heat) away from the reactor and to transfer the heat to a secondary loop. The secondary loop is isolated from the primary loop and generates steam from the heat passed from the primary loop. The steam of the secondary loop is used to produce electricity as is well known in the art. The primary loop then returns the borated water back into the reactor where the above described process is repeated.

A pressurizer vessel is connected to the primary loop for maintaining a constant pressure in the primary loop. The pressurizer vessel includes a protective shell forming an interior portion for containing any water and steam therein. The protective shell includes a cylindrical shaped side terminating at a hemispherical shaped head at both its top and bottom end, with the bottom end attached to a cylindrical support skirt. An outwardly extending flange extends radially outwardly from the skirt bottom for attaching it to its support structure, typically a floor. A nozzle at the bottom of the lower hemisphere connects to piping which attaches to the primary loop for allowing the primary loop and the pressurizer vessel to pass the borated therebetween which, in turn, functions to maintain proper pressurization of the primary loop. A heater support plate is located in a lower portion of the shell interior for receiving a plurality of electrical heaters which, during plant operation, are turned on to further heat the water or to maintain the temperature of the water at a constant temperature. A spray valve is positioned at an upper portion of the shell interior for spraying water in the shell interior which condenses the steam back to water. A liquid space temperature detector is attached to the shell side and projects radially into the interior of the shell for measuring the water temperature.

During operation of the power plant, a transient event that could decrease system pressure, for example, is counteracted by increasing the water temperature via the electrical heaters which, in turn, causes a portion of the water to flash to steam. An increasing pressure transient is limited by spraying cooler water from the primary loop via the spray valve into the shell interior which, in turn, causes a portion of the steam to condense to water.

The detector is positioned below and generally parallel to the water surface so that the temperature of the water is detected at a constant elevation. However, the water level varies up and down in the vessel interior during operation due to the electrical power demand of the power plant; thus, the temperature detector monitors different portions of the water as it varies up and down in the vessel interior. If a vertically oriented, temperature gradient exists, as is usually the case, it will only be detected when it passes upwardly or downwardly past the temperature detector.

Although the present device for monitoring the water temperature is satisfactory, it is not without drawbacks. The water temperature is presently measured at only one elevation so that temperature gradients are only detected when the water level rises or falls enough to cause the temperature gradient to pass by the temperature detector. Therefore, temperature gradients are not detected on a real time basis.

Consequently, a need exists for an improved device and method for monitoring the water temperature in a pressurizer vessel which overcomes the deficiencies of the presently known and utilized method and device.

SUMMARY OF THE INVENTION

The present invention provides an improvement designed to satisfy the aforementioned needs. Particularly, the present invention is directed to a pressurizer vessel for containing a liquid and steam both of which function to maintain pressure in a primary loop of a nuclear power plant comprising: a) a heater support plate disposed in an interior portion of the pressurizer vessel; b) a plurality of heaters mating with said heater support assembly for heating the liquid; c) a temperature detector operatively connected to said heater support assembly in a structural arrangement which allows for measuring the temperature of the liquid at preselected elevations; and wherein said temperature detector includes temperature measuring means for measuring a plurality of temperature readings of the liquid at preselected elevations of the liquid.

In another broad form, the invention is directed to a method for measuring temperature of a liquid in a pressurizer vessel of a nuclear power plant comprising: a) installing a plurality of electrical heaters in a plurality of receiving receptacles of a heater support assembly disposed in an interior portion of the pressurizer vessel for heating the liquid; and b) replacing at least one electrical heater with a temperature detector having means for measuring the temperature of the liquid at preselected elevations.

It is an object of the present invention to provide a method and apparatus for measuring the temperature of the water in the pressurizer vessel so that temperature gradients are detected on a real time basis.

It is a feature of the present invention to provide a temperature measuring device for constantly measuring a plurality of temperature readings of the liquid at preselected elevations of the liquid.

It is an advantage of the present invention to provide a temperature measuring device which is interchangeable with the presently utilized electrical heaters.

These and other objects, features, and advantages will become apparent to those skilled in the art upon a reading of the following detailed description when taken in conjunction with the drawings wherein there is shown and described illustrative embodiments of the invention.

BRIEF DESCRIPTION OF THE DRAWINGS

In the course of the following detailed description, reference will be made to the attached drawing in which.

DETAILED DESCRIPTION OF THE INVENTION

Figure 1:
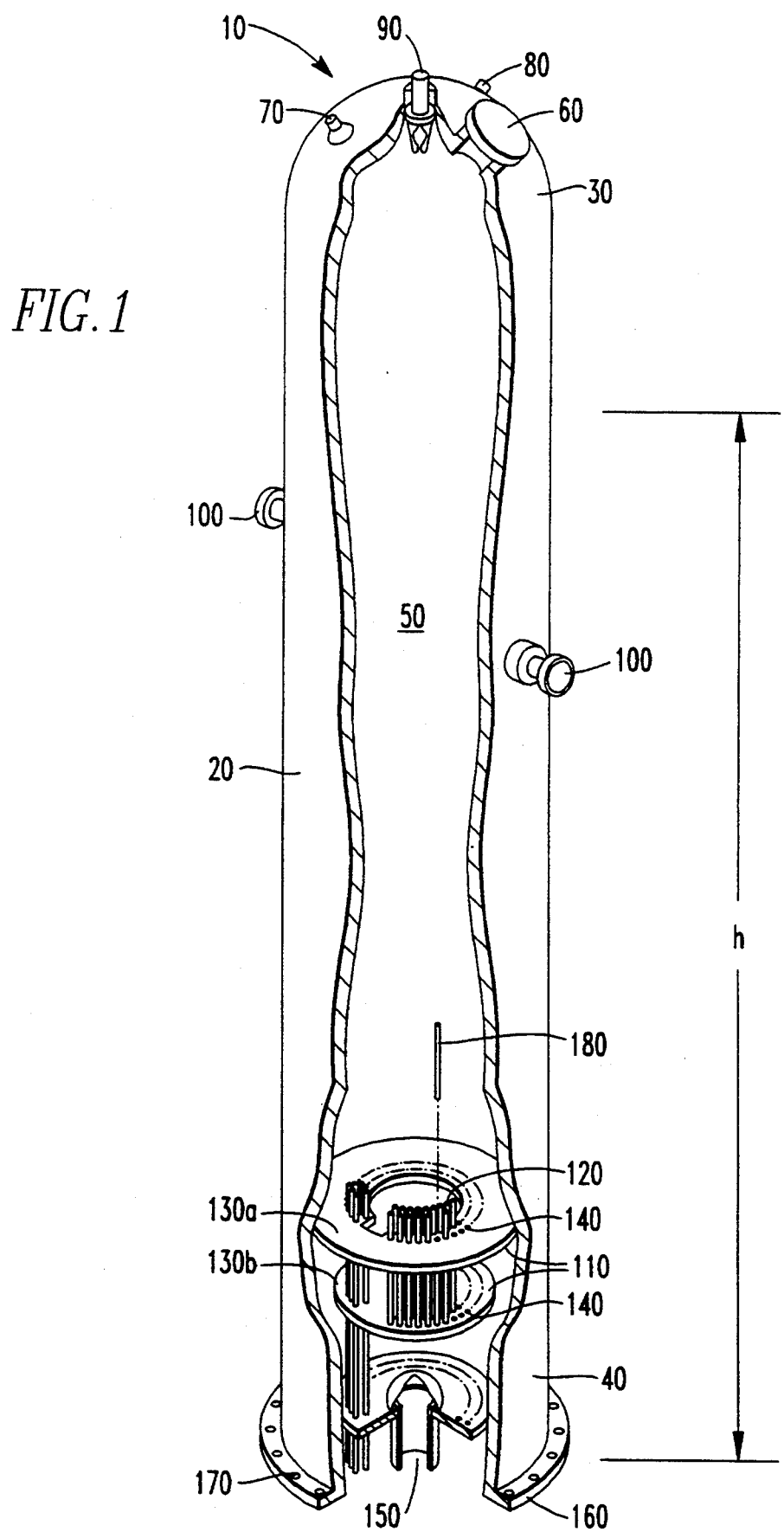
FIG. 1 is a side elevation view of a pressurizer vessel in partial vertical cross section.

In the following description, like reference characters designate like or corresponding parts throughout the several views of the drawings. Also, in the following description, it is to be understood that such terms as "forward," "left," "right," "upwardly," "downwardly," and the like are words of convenience and are not to be construed as limiting terms.

Referring now to the drawings, and more particularly to FIG. 1, there is illustrated a pressurizer vessel, generally referred to as 10, for use in a nuclear power plant as is well known in the art. The pressurizer vessel 10 includes a protective shell 20 having an upper head 30 and a lower head 40 both defining an interior portion 50 for containing any water and steam therein. The upper head 30 includes a manway 60 for allowing maintenance personnel and the like to enter the pressurizer vessel 10, and further includes a relief nozzle 70 for venting steam outside the pressurizer vessel 10 if the design pressure capability of the pressurizer vessel 10 is exceeded. The relief nozzle 70 is automatically opened above system design pressure, and can also be opened manually from a control console in a control room (both of which are not shown) if necessary. If system pressure continues to rise, a self-actuating safety nozzle 80, connected by piping to the relief nozzle 70, will open. Steam from the safety nozzle 80 or relief nozzle 70 is piped to a pressure relief tank (not shown) which contains sufficient water to condense the steam. A spray nozzle 90 is positioned atop the pressurizer vessel 10 and extends into the shell interior portion 50 for spraying water into the pressurizer vessel 10 which condenses the steam to water. Two lifting trunnions 100 both extend radially and outwardly from the protective shell 20 for lifting the pressurizer vessel 10 during installation and the like.

A tiered, circular shaped heater support assembly 110 is located in the interior portion 50 of the lower head 40 and is attached to the shell 20 for structural support. The heater support assembly 110 is operable to matingly receive a plurality of electrical heaters 120. The heater support assembly 110 includes two horizontally oriented, spaced apart plates, top plate 130a and bottom plate 130b, each having a plurality of holes 140 which are respectively in registry with each other. Each pair of aligned holes 140 receives an electrical heater 120, typically a total of seventy eight, for heating the water. The electrical heaters 120 are tubular shaped elements and are either partially or totally submerged in the water during operation. This is because the water level varies up and down along an elevation (h) in the vessel interior 50 during operation due to the electrical power demand of the power plant and the like.

A surge nozzle 150 attaches to the bottom of the pressurizer vessel 10 and extends up into the vessel interior 50 for allowing water from the primary loop (not shown) to flow into and out of the vessel interior 50 for maintaining proper pressurization of the primary loop. A support skirt 160 extends axially downwardly and radially outwardly from the lower head 40 and includes a plurality of holes 170 for attaching the pressurizer vessel 10 to its support structure, typically a floor (not shown).

The preferred embodiment of the present invention includes replacing a presently existing electrical heater 120 with a temperature measuring device 180 of the present invention. Although in the preferred embodiment only one heater 120 is replaced, any number may be replaced as long as the heating function of the electrical heaters 120 is not impaired. The temperature detector 180 is installed extending through plate 130b for structural support. As will be discussed in detail below, the temperature measuring device 180 includes a plurality of thermocouples (not shown in FIG. 1) which enable the temperature detector 180 to detect temperature gradients in the water.

Figure 2:
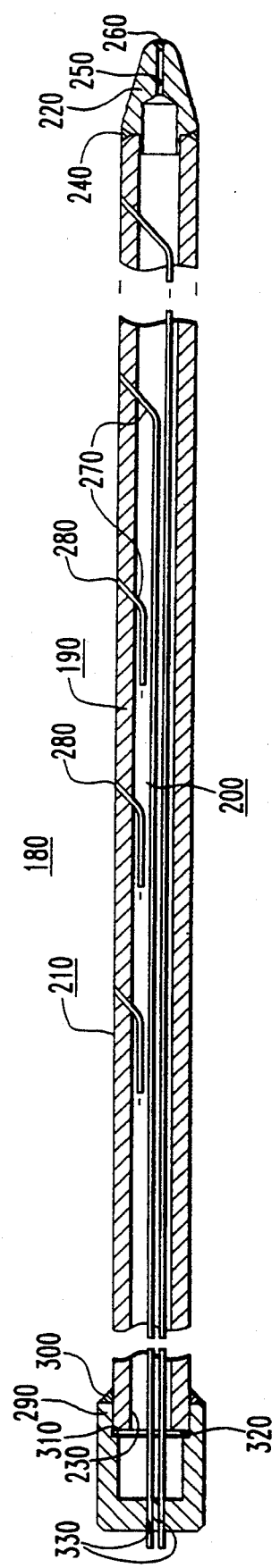
FIG. 2 is a side elevation view of a temperature detector of the present invention in vertical cross section for detecting temperature gradients on a real time basis in a pressurizer vessel.

Referring to FIG. 2, the temperature measuring device 180 of the present invention is illustrated in detail. The device 180 includes a housing 190 defining an interior portion 200. The housing 190 includes a generally cylindrical shaped side 210 terminating at one end with a rounded shaped tip 220 and with an opening 230 at its other end. The tip 220 is welded via a weldment 240 to the side 210 for providing a pressure boundary, and includes a hollowed-out portion 250 which provides access to the housing interior 200 during manufacturing for pressurizing the housing interior. The hollowed-out portion 250 is welded via a weldment 260 after pressurization for providing a pressure boundary. The temperature measuring device 180 is disposed in the holes 140 of the support plate 130a (both not shown in FIG. 2) so that the tip 220 points upwardly toward the upper head 30 (not shown in FIG. 2).

A plurality of thermocouples 270 are disposed in the housing interior 200 and each extend through the side 210 for exposing a welded end 280 of each thermocouple to the environment surrounding the housing 190. This penetration allows each thermocouple 270 to measure the temperature of the surrounding environment. In this embodiment, the environment is typically water. By including a plurality of thermocouples 270 in the housing 190, a plurality of temperature readings is available from the respective thermocouples 270 for detecting temperature gradients. Thermocouples are well known in the art and are disclosed in U.S. Pat. Nos. 2,957,037, 2,924,976, and 2,946,835 all of which are hereby incorporated by reference.

An enclosure 290 is matingly attached by a weldment 300 to the open end 230 of the housing 190 for forming a sealed enclosure. A counterbore 310 is provided in an interior portion of the enclosure 290 for purposes of fabrication. An air gap 320 is typically located between the housing 190 and the counterbore 310 for providing space for thermal expansion of the enclosure 290 and housing 190 during operation. A plurality of bores 330 extend through a bottom of the enclosure 290 for allowing the thermocouples 270 to exit the enclosure 290 and to be connected to process instrumentation (not shown), which is well known in the art, for processing the plurality of temperature readings. It can be appreciated that the number of bores 330 correspond to the number of thermocouples 270.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described merely a preferred or exemplary embodiment thereof.

We claim:

1. A pressurizer vessel containing a liquid and steam both of which function to pressurize a reactor coolant system of a nuclear plant, the pressurizer vessel comprising:
    a) a heater support assembly disposed in an interior portion of the pressurizer vessel;
    b) a plurality of heaters mating with said heater support assembly for heating the liquid;
    c) a temperature detector operatively connected to said heater support assembly in a structural arrangement which measures the temperature of the liquid in the pressurizer vessel at preselected elevations; and
    wherein said temperature detector includes temperature measuring means for measuring a plurality of temperature readings of the liquid at preselected elevations of the liquid.

2. The pressurizer vessel as in claim 1, wherein said temperature measuring means is a plurality of spaced apart thermocouples extending along said temperature detector for measuring the plurality of temperature readings.

3. The pressurizer vessel as in claim 2, wherein said temperature detector is positioned with its longitudinal length substantially perpendicular with a heater support plate for measuring the temperature of the liquid.

4. The pressurizer vessel as in claim 3, wherein said temperature detector is positioned in a heater hole for measuring the temperature of the liquid.

5. A pressurizer vessel containing a liquid and steam both of which function to pressurize a reactor coolant system of a nuclear power plant comprising:
    a) a plurality of electrical heaters positioned in an interior portion of the pressurizer vessel for heating the liquid;
    b) a heater support assembly disposed in the interior portion of the pressurizer vessel and operable to receive said plurality of electrical heaters; and
    c) a temperature detector operatively mating to said heater support assembly for interchangeably replacing at least one of said electrical heaters which measure the temperature of the liquid;
    wherein said temperature detector includes temperature measuring means for measuring a plurality of temperature readings of the liquid at preselected elevations of the liquid.

6. The pressurizer vessel as in claim 5, wherein said temperature measuring means is a plurality of spaced apart thermocouples each extending along a longitudinal length of said temperature detector for measuring the plurality of temperature readings.

7. A method for measuring temperature of a liquid in a pressurizer vessel of a nuclear power plant comprising, which contains a liquid and steam both of which function to pressurize a reactor coolant system, the method comprising the steps of:
    a) installing a plurality of electrical heaters in a plurality of receiving receptacles of a heater support assembly disposed in an interior portion of the pressurizer vessel for heating the liquid; and
    b) placing at least one temperature detector, having means for measuring the temperature of the liquid at preselected elevations, in a substantially vertical position in a receiving receptacle of the heater support assembly for measuring the temperature of the liquid.

8. The method as in claim 7, wherein said placing of step (b) includes initially installing a temperature detector in a receiving receptacle.

9. The method as in claim 7, wherein said placing of step (b) includes replacing an installed electrical heater with a temperature detector.

10. The method as in claim 9 further comprising the step of measuring the temperature of the liquid with a plurality of spaced apart thermocouples each positioned in an interior portion of the temperature detector.

* * * * *